(12) United States Patent
Winn et al.

(10) Patent No.: US 10,196,142 B2
(45) Date of Patent: Feb. 5, 2019

(54) METHOD FOR ADAPTIVE MISSION EXECUTION ON AN UNMANNED AERIAL VEHICLE

(71) Applicant: Infatics, Inc., San Francisco, CA (US)

(72) Inventors: Michael Winn, San Francisco, CA (US); Jonathan Millin, San Francisco, CA (US); Nicholas Pilkington, San Francisco, CA (US); Jeremy Eastwood, San Francisco, CA (US)

(73) Assignee: Infatics, Inc., San Francisco, CA (US)

( * ) Notice: Subject to any disclaimer, the term of this patent is extended or adjusted under 35 U.S.C. 154(b) by 61 days.

(21) Appl. No.: 15/601,867

(22) Filed: May 22, 2017

(65) Prior Publication Data

US 2017/0259917 A1  Sep. 14, 2017

Related U.S. Application Data

(63) Continuation of application No. 14/717,955, filed on May 20, 2015, now Pat. No. 9,688,403.

(60) Provisional application No. 62/000,933, filed on May 20, 2014, provisional application No. 62/045,473, filed on Sep. 3, 2014.

(51) Int. Cl.
  *G05D 1/00* (2006.01)
  *B64C 39/02* (2006.01)
  *G05D 1/02* (2006.01)

(52) U.S. Cl.
  CPC ......... *B64C 39/024* (2013.01); *G05D 1/0094* (2013.01); *G05D 1/0202* (2013.01); *B64C 2201/021* (2013.01); *B64C 2201/042* (2013.01); *B64C 2201/123* (2013.01)

(58) Field of Classification Search
  None
  See application file for complete search history.

(56) References Cited

U.S. PATENT DOCUMENTS

| | | | | |
|---|---|---|---|---|
| 6,151,539 | A * | 11/2000 | Bergholz | G01S 13/931 340/435 |
| 9,266,611 | B2 * | 2/2016 | Rambo | B64C 39/024 |
| 9,346,543 | B2 * | 5/2016 | Kugelmass | G05D 1/101 |
| 9,346,544 | B2 * | 5/2016 | Kugelmass | G05D 1/101 |
| 2010/0004802 | A1 * | 1/2010 | Bodin | G05D 1/0038 701/11 |

\* cited by examiner

*Primary Examiner* — Redhwan K Mawari
*Assistant Examiner* — Edward Torchinsky
(74) *Attorney, Agent, or Firm* — Jeffrey Schox; Diana Lin

(57) ABSTRACT

A method for adaptive mission execution by an unmanned aerial vehicle includes receiving a set of pre-calculated mission parameters corresponding to an initial UAV mission; collecting UAV operation data during flight of the unmanned aerial vehicle; calculating a set of modified mission parameters from the set of pre-calculated mission parameters and the UAV operation data, the set of modified mission parameters corresponding to a modified UAV mission; and executing the modified UAV mission on the unmanned aerial vehicle.

20 Claims, 4 Drawing Sheets

METHOD FOR ADAPTIVE MISSION EXECUTION ON AN UNMANNED AERIAL VEHICLE

CROSS-REFERENCE TO RELATED APPLICATIONS

This application is a continuation of U.S. patent application Ser. No. 14/717,955, filed 20 May 2015, which claims the benefit of U.S. Provisional Application No. 62/000,933, filed on 20 May 2014, and of U.S. Provisional Application No. 62/045,473, filed on 3 Sep. 2014, all of which are incorporated in their entireties by this reference.

TECHNICAL FIELD

This invention relates generally to the field of unmanned aerial vehicles and more specifically to a new and useful method for adaptive mission execution on an unmanned aerial vehicle in the field of unmanned aerial vehicles.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
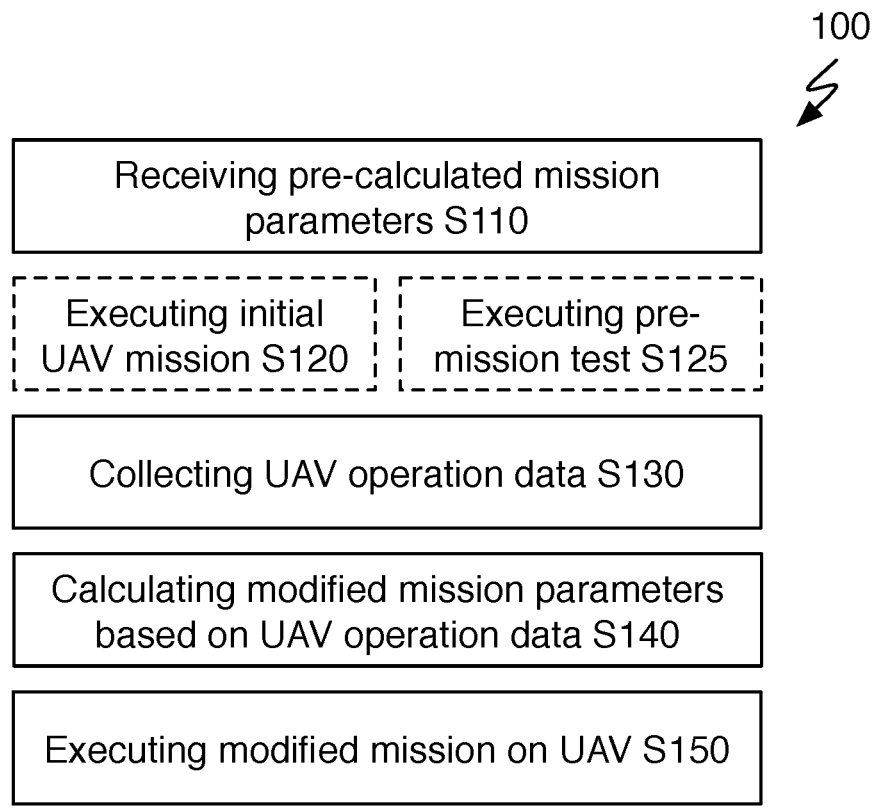
FIG. 1 is a chart representation of a method of a preferred embodiment.

As shown in FIG. 1, a method 100 for controlling an unmanned aerial vehicle (UAV) includes: receiving a set of a pre-calculated mission parameters corresponding to an initial UAV mission S110, collecting UAV operation data during flight of the UAV S130, calculating a set of modified mission parameters based on the UAV operation data S140, and executing the modified mission on the UAV S150. The method 100 may additionally or alternatively include executing the initial UAV mission S120, and/or executing a pre-mission test S125.

Generally, the method functions to test operation of a UAV during or just prior to a execution of a mission by the UAV, to check the status of the UAV against a flightpath for the mission, and to adjust the flightpath and/or other mission parameters if necessary to ensure that the UAV can complete the mission satisfactorily. For example, the method can analyze operation data of the UAV to detect a state of charge of a battery within the UAV, to detect a stability of the UAV airframe, and/or to detect a maximum speed and a stall speed of the UAV, etc., and the method can then adjust a cruise speed, a ground area to be covered, the flightpath, etc. for the mission to substantially ensure that the UAV—in its current measured state—can complete the mission (e.g., a surveillance mission, a logistics or delivery mission, or a mapping mission). The method can similarly model operation of a particular UAV based on UAV flight data collected during a test flight flown by the particular UAV, and the method can then pass the model of the particular UAV to a mission generator such that subsequent missions generated for the particular UAV can accommodate or compensate for a substantially unique configuration, condition, etc. of the particular UAV, which may differ in configuration or condition from other UAVs in a fleet of UAVs. For example, the method can collect battery capacity data, motor efficiency data, fuselage capacity and stability data, etc. of the UAV as the UAV flies a standardized test flight and then calculate a preferred cruise speed based on motor efficiency, a minimum air flight speed, a maximum air speed, and/or a relationship between total (air or ground) range relative to air speed, etc. of the UAV. In this example, at a later date following the standardized test flight, a mission generator can then access these calculated values and implement these values as parameters to generate a flight path of the UAV over a ground area of interest such that the flight path inherently accommodates limitations of the UAV.

The method can further function to track usage of (e.g., hours on) one or more components of the UAV, to compare usage of these components to component use regulations and/or manufacturer use suggestions, and to prompt an owner or operator of the UAV to preemptively swap out components of the UAV as these components reach the end of their respective useful or regulated lives. For example, the method can collect motor speed data during each mission flown by a UAV to track a total number of hours of operation of the UAV motor (or a total number of rotations of the motor throughout missions flown by the UAV), compare the total hours of operation on the motor to the manufacturer's suggested total hours on the model of motor before replacement or rebuild, and then transmit a notification (e.g., a message, an email) to an account of an operator associated with the UAV to prompt the operator to replace or rebuild the motor. The method can also automatically detect changes to the UAV, such as replacement of a motor, a propeller (or "prop"), a control surface actuator, a battery, or all or a portion of the fuselage, etc., and the method can automatically update a database of log data specific to the UAV to account for such change. For example, the method can calculate a relationship between air speed of the UAV and current draw of the motor during the test flight, compare this calculated relationship to a similar relationship calculated for the UAV during a previous flight or test flight to determine if a new motor was swapped into the UAV prior to the current test flight, and update a log of specific to the UAV to reflect this change in motors. In particular, in this example, the method can reset a time counter for a motor within the UAV to "0" to reflect detected installation of a new motor into the UAV.

The method can therefore collect data from a UAV and manipulate these data to modify pre-calculated flight paths and to log use of various (critical) components of the UAV. The method can therefore execute remotely from the UAV, such as on a remote computer system that generates missions for one or more UAVs (e.g., a fleet of UAVs) according to selected ground areas of interest and/or that controls UAVs remotely during execution of missions. The computer system can be a cloud-based computer (e.g., Amazon EC2), a mainframe computer system, a grid-computer system, or any other suitable computer system. For example, the computer system can be a remote server that communicates with one or more UAVs over HTTP (or TCP or UDP) protocols through a web service (e.g., Amazon AWS). The computer system can thus transmit data (e.g., mission commands, flight paths, UAV location, UAV operation data) to and from a UAV over a cellular, Wi-Fi, satellite, or other suitable wireless network. Alternatively, the method can be implemented on a local computing device. For example, a local flight control station specific to one or more UAVs and including a wireless radio can implement the method to communicate with the UAV(s) directly over a cellular communication protocol before, during, and/or upon completion of the mission. Yet alternatively, the method can be implemented by a computing device arranged in the UAV within the fleet. For example, a UAV can incorporate a processor that interfaces with an autopilot module and a wireless transceiver within the UAV to collect UAV operation data (e.g., GPS data, telemetry data, sensor status data, network connectivity data, etc.), to manipulate the UAV operation data, to log the operation data, to transmit prompts to an operator, and/or to modify a flightpath according to detected limitations of the UAV. However, the method can be implemented by any one or more of a remote computer system, a local flight control station, or one local computing device arranged in a UAV. For example, in a default setting, the method can be implemented by the remote computer system but, when long-range wireless (e.g., cellular) communication with the fleet is lost, a local computing device within a UAV can assume a master control position and implement remaining elements of the method until long-range wireless communication is regained. However, the method can be implemented in any other suitable way.

Figure 2:
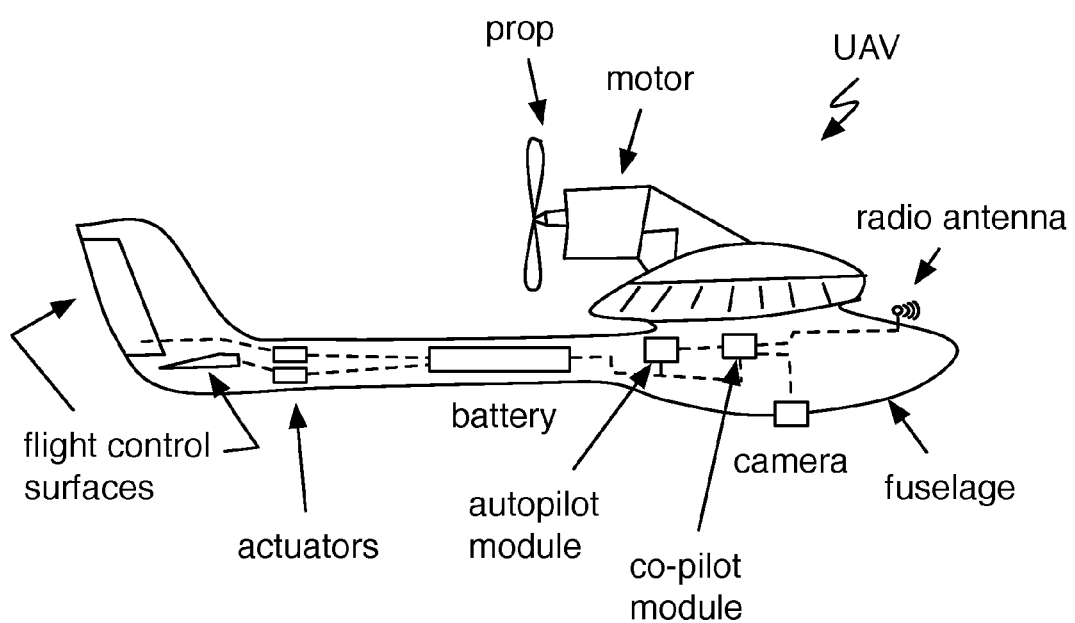
FIG. 2 is a system diagram representation of an unmanned aerial vehicle.

The method can therefore execute in conjunction with a UAV that includes: flight control surfaces; actuators configured to manipulate the flight control surfaces; a motor; a prop; an autopilot module configured to control the actuators and the propulsion assembly according to a scheduled flightpath; a co-pilot module providing an interface between a remote computer network and the autopilot module, actuators within the UAV, and sensors within the UAV; and a fuselage supporting the flight control surfaces, the actuators, the autopilot module, the propulsion assembly, and the co-pilot module, as shown in FIG. 2. The UAV can also include various sensors, such as a three-dimensional optical sensor, (e.g., a LIDAY system, a stereoscopic camera), a two-dimensional sensor (e.g., a CMOS digital camera, a thermal imaging sensor), and/or a single-dimensional sensor (e.g., a chemical sensor, a temperature sensor, a barometric sensor), etc., that capture data during missions executed by the UAV, and the co-pilot module can interface with a wireless communication module within the UAV to upload data from these sensors (and actuator data) to a remote database executing all or a portion of the method. The UAV can therefore include a fixed-wing aircraft. Alternatively, the UAV can include a vertical takeoff and landing (VTOL) aircraft. The UAV can also be a component of an unmanned aerial system (UAS) that includes sensors, ground control software (GCS), infrastructure (e.g., radios, a mission control station), support crews, maintenance crews, etc.

S110 includes receiving a set of a pre-calculated mission parameters corresponding to an initial UAV mission. The set of pre-calculated mission parameters preferably include a UAV flightpath (specified by global coordinates or any other coordinate system, including local coordinate systems), but may additionally or alternatively include any parameters corresponding to a UAV mission (e.g., altitude, air speed, ground speed, flight time, flight control surface positions, camera shutter events, actuator settings, etc.). For example, the set of pre-calculated mission parameters may include a set of waypoints for the UAV to fly along, along with a set of parameters specifying when a UAV camera should take aerial photographs along the route.

S110 preferably includes receiving pre-calculated mission parameters at the UAV from a remote server over a wireless internet connection (e.g., a cellular connection), but may additionally or alternatively include receiving pre-calculated mission parameters in any suitable manner (e.g., via a flash drive plugged into the UAV).

S120 includes initiating execution of the initial UAV mission. S120 functions to begin UAV flight (and/or other operations) according to the pre-calculated mission parameters. The method 100 may include S120 for a number of reasons; e.g., if the UAV is expected to be able to complete the initial mission. If data collected during the initial UAV mission indicates a less-than-satisfactory mission outcome (as collected and analyzed in S130), the mission may be modified (S140 and S150).

S125 includes executing a pre-mission test. In one implementation, the pre-mission test is a standardized test defining a test flightpath suitable to test various components of the UAV, such as a motor, a battery, a prop, a fuselage, and/or control surfaces of the UAV, and the co-pilot within the UAV can interface with various sensors and actuators within the UAV to collect data for these components as the UAV executes the test flightpath. For example, the pre-mission test can define: a first portion of the test flightpath specifying level flight at an altitude of loom at full power from which a maximum air speed of the UAV is determined; a second portion of the test flightpath specifying a near-vertical climb from loom altitude from which a maximum thrust of the UAV is determined; a third portion of the test flightpath specifying a decrease in air speed until stall is achieved from which a stall speed of the UAV is determined; a fourth portion of the test flightpath specifying a cycling ramping the motor from a no-power to a full-power setting from which a motor torque curve, a maximum motor torque, a motor efficiency curve, a propeller efficiency, a battery state of charge, and/or a maximum battery supply current, etc. of the UAV is calculated; and a fifth portion of the test flightpath specifying cycles of pitch, yaw, and/or roll control surfaces from which an efficiency of the fuselage and/or a weight of the fuselage is calculated. For example, the total standardized pre-mission test sequence can be completed within a period of sixty seconds prior to execution of a mission thirty-minutes in duration. However, the standardized pre-mission test sequence can define any other flightpaths or operations from which various UAV parameters or functions can be calculated.

Pre-mission tests may test any UAV components, including any sensors coupled to the UAV (e.g., cameras, chemical sensors, photodetectors, microphones, RADAR/SONAR sensors, etc.)

In addition or as an alternative to UAV component tests, pre-mission tests may include flightpaths or other operations directed to measuring characteristics of the flight environment (e.g., air temperature, wind speed, obstacles present in a particular area, etc.).

In one variation, S125 may include performing an "onboarding" flight test when a (new) UAV is added to a UAV fleet or during a "reset" flight test following a rebuild. For example, the UAV can takeoff, execute the pre-mission test sequence, offload any of the foregoing data to the remote UAV management network, and then land again without executing another mission, S130 can characterize the UAV from these data, and the remote UAV management network can implement this characterization of the UAV when generating flight paths and flight parameters of the UAV in subsequent missions designating the UAV and elected by an operator.

The method 100 may include either or both of S120 and S125. For example, the method may include performing a pre-mission test (S125), passing the pre-mission test, and then initiating execution of the initial mission without modification (S120).

S130 includes collecting UAV operation data during flight of the UAV. S130 functions to collect UAV operation data (e.g., UAV component data, UAV sensor data, environmental data, etc.) for purposes of modifying the initial UAV mission.

UAV operation data preferably includes any data relevant to UAV operation; e.g., air speed, heading, ground speed, position, orientation, camera data, air temperature data, actuator status, sensor data, payload data, UAV communication data, UAV flightpath, and humidity. In particular, UAV communication data may include mission parameters transmitted/received by other UAVs. For example, a first UAV may update a flightpath for aerial photography and then transmit that updated flightpath to other UAVs. If the new flightpath intersects with any other UAV's flightpath, the intersecting UAV may alter its flightpath to avoid covering the same area redundantly (unless overlapping coverage is desired).

S130 may be performed at any time, including during a pre-mission test and/or in real-time during a mission.

S130 preferably includes collecting UAV operation data at the UAV, but may additionally or alternatively include transmitting UAV operation data to be collected by a remote computer. For example, the UAV co-pilot (or other processor, memory module, etc.) within the UAV can sample the autopilot, various sensors, and various actuators within the UAV, such as according to an internal or external clock and a preset sampling rate (e.g., 20 Hz) and then upload these data substantially in real-time to a remote computer network over wireless communication. A remote UAV management network can receive data downloaded from the co-pilot over cellular communication protocol as these data are collected at the UAV. Alternatively, collected data could be retrieved in bulk upon completion (or abortion) of a mission or pre-mission test sequence.

S130 may include processing raw data received at the UAV (or remote computer). For example, S130 may include calculating a motor efficiency based on motor rotational speed and airspeed.

In one example, S130 includes receiving an output voltage (and/or an output current) of a main battery within the UAV at various throttle settings of the motor, such as at 0%, 25%, 50%, 75%, and 100% throttle settings, and then transforming these voltage readings into battery state of charge based on a known discharge curve of the battery. S130 can alternatively include integrating a current output of the battery over time, implementing Kalman filtering, or monitoring an internal pressure of the battery to calculate a state of charge of the battery. S130 can then calculate a range of the UAV based on the state of charge of the UAV, and also accommodate for wind conditions over a ground area over which the UAV will fly during the mission to calculate total ground distance that the UAV can traverse in its current state. In another example, S130 can record collect steady state temperatures within the fuselage for various throttle settings of the motor, and calculate a maximum allowable throttle setting or a maximum allowable current draw for the current mission based on a maximum allowable battery and/or fuselage temperature for the UAV. In a similar example, S130 can collect steady state temperatures of the motor at various throttle settings, and identify a maximum air speed of the UAV based on a maximum allowable temperature of the motor. In another example, S130 can collect acceleration and rotation data from an accelerometer and a gyroscope arranged within the UAV during various maneuvers executed by the UAV during the pre-mission test sequence, and characterize pitch, yaw, and roll responses of the UAV to manipulation of the control surfaces to detect a stability of the UAV flight. In this example, S130 can determine that the UAV is unstable and therefore unfit for flight if the UAV exhibits extreme changes pitch, yaw, and/or roll in response to a small change in the position of a control surface, if the UAV exhibits no change in pitch, yaw, and/or roll in response to a large change in the position of a control surface, or if constant manipulation of the control surfaces is required for the UAV to fly in a straight line. In this example, S130 can also determine a tightest turning radius (at one or more cruise speeds), climb rate, and/or descent rate of the UAV from these rotation and acceleration data. However, S130 can collect and/or receive UAV operation data in any other way and extract any one or more UAV characteristics from these data.

In one implementation, S130 is executed by a computer network that receives data from the UAV in raw, unprocessed form or in compressed form; the network can then process these data to determine if the UAV is capable of completing a current mission (within a reasonable degree of certainty). Alternatively, the UAV can execute all or a portion of S130 locally and then upload results (e.g., a calculated motor torque curve, maximum motor torque, motor efficiency curve, propeller efficiency, battery state of charge, maximum battery supply current, etc.) to the computer network.

S140 includes calculating a set of modified mission parameters based on the UAV operation data. S140 is preferably executed in response to a determination or estimation that the UAV is unable to complete the initial mission, based on data collected during the pre-mission test and/or execution of the initial mission. Additionally or alternatively, S140 may be performed at any time in response to any stimulus; for example, a set of modified mission parameters may be calculated in response to a user request for mission modification.

S140 may include comparing UAV characteristics (as collected and processed in S130) to characteristics required for performance of the set of pre-calculated mission parameters to determine if the UAV is capable of completing the mission as currently defined and/or what modification to the mission may be necessary to increase odds of success.

In one implementation, UAV component data is manipulated to generate a curve defining predicted total ground distance that can be covered by the UAV relative to ground speed of the UAV, based on a state of charge of the battery within the UAV, a curve defining a relationship between air speed and battery output power (and bounded by the maximum air speed and stall speed of the UAV), and a current (or forecast) weather condition (e.g., wind speed and direction) at the location specified in the mission (e.g., as collected from a remote weather database). In this implementation, a total ground distance that must be covered by the UAV to complete the mission as currently defined can be calculated and compared to a maximum total ground distance that can be traversed by the UAV in its current state to determine if the UAV can complete the mission. (In this implementation, local weather (e.g., wind) data can be applied to this comparison, such as by accessing local wind data from a remote weather database.) If the total ground distance required to complete the mission does not exceed the total estimated ground range of the UAV, the UAV can begin the mission as currently prescribed. Alternatively, an air speed specified in the mission parameters can be adjusted to increase an efficiency of the UAV during the mission, such as by setting a target air speed of the UAV at an air speed corresponding to a best compromise of maximum motor efficiency and maximum battery efficiency, and updating parameters of the mission to reflect this new target air speed for the UAV during execution of the mission. Alternatively, S140 can calculate a maximum air speed of the UAV at which the UAV can still complete the mission in order to reduce total flight time of the UAV (and therefore total operator cost) for completion of the mission, update parameters of the mission to reflect this new target air speed for the UAV.

Figure 3:
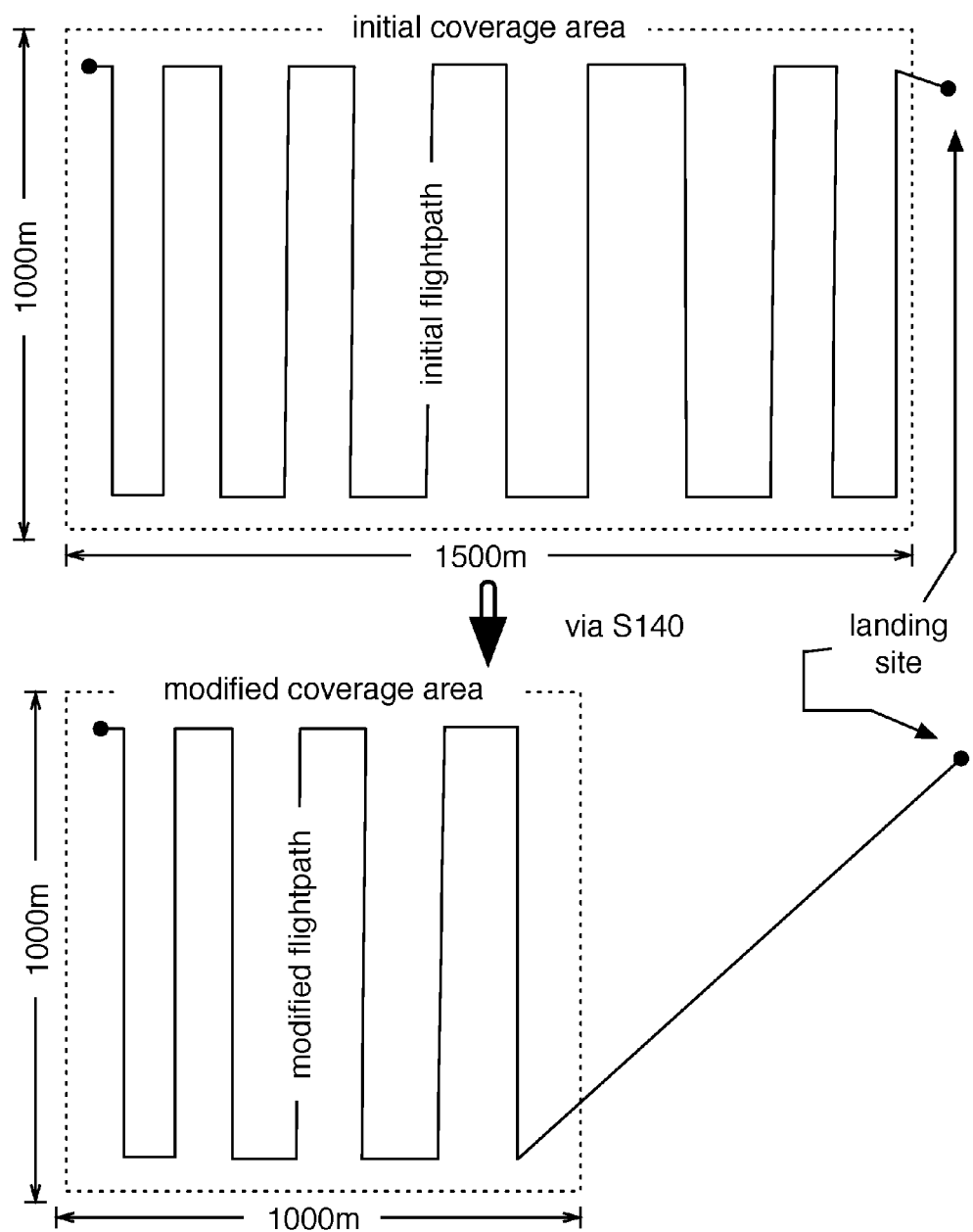
FIG. 3 is a schematic representation of example mission modification of a method of a preferred embodiment.

However, in this implementation, if the total ground distance to be covered by the UAV during the mission exceeds the total range capacity of the UAV, S140 can include altering the mission to accommodate this deficiency of the UAV. For example, S140 can change a primary direction of flight of the UAV during the mission to reduce a duration of the mission over which the UAV flies directly into the wind, thereby extending a ground distance that can be traversed by the UAV during execution of the updated mission. In another example in which the mission specifies a ground area of interest for the UAV to image with a camera installed therein, S140 can reduce a size of the ground area of interest such that a total ground distance that the UAV must cover to achieve a target lateral step-over distance and a target longitudinal step-over distance between images captured by the UAV without exceeding the estimated total ground range of the UAV, such as shown in FIG. 3. In a similar example, in which the mission specifies a ground area of interest for the UAV to image with a camera installed therein, S140 can increase an altitude at which the UAV is to capture images of a specified ground area to reduce a number of cut-back sections of the flight path of the mission to reduce a total ground distance that must be covered by the UAV to fully image the area of interest. In another example, S140 can determine that a target cruise speed of the UAV is to low or too high for the UAV to complete the mission as currently specified, and S140 can thus set a new target cruise speed for the mission such that the UAV can operate at an improved efficiency sufficient to complete other parameters of the mission. In yet another example, S140 includes splitting the mission into segments. Mission segments may then be executed serially or in parallel by one or more UAVs.

S140 can therefore handle data from multiple UAVs to generate and/or manipulate corresponding missions parameters. However, S140 can alter any other parameter of the mission.

In one implementation, a UAV executes a mission to take aerial photographs of a particular area. The photographs collected by the UAV are analyzed in S130 (by the UAV and/or by a remote computer); any images deemed unsatisfactory (e.g., a particular area covered in shadow, a blurry photograph) may result in the flight plan of the UAV being modified to recapture the areas of issue.

In another implementation, a UAV executes a mission following an oil pipeline while taking samples with a hydrocarbon sensor. If the UAV detects anomalies in sensed hydrocarbon data collected in S130 (e.g., an unexpectedly high level of a particular hydrocarbon), the mission may be altered by S140 to provide further information on areas containing the anomalies (e.g., the flightplan may be altered to a spiral pattern mapping a circle centered on the anomaly).

Figure 4:
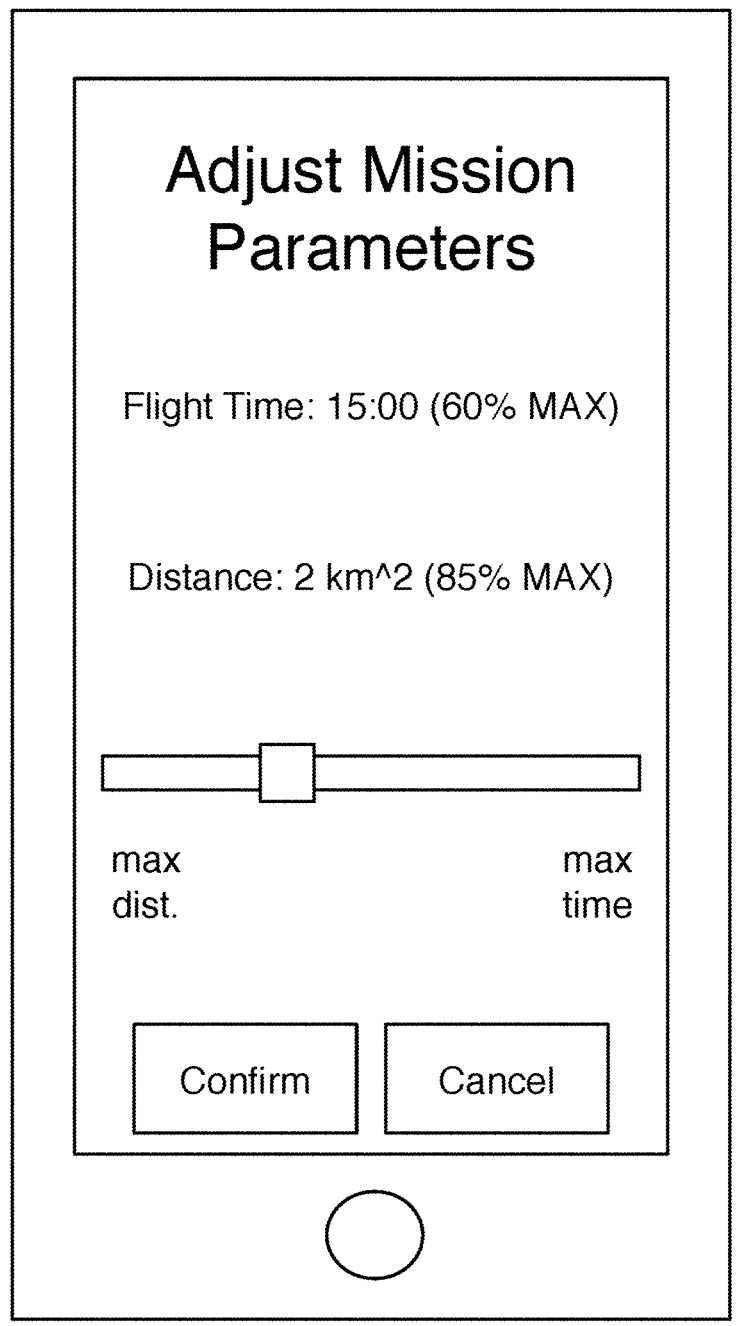
FIG. 4 is an example representation of a mission parameter adjustment display.

In a variation of a preferred embodiment, S140 may include prompting an operator to select a type of change to be made to the mission and/or to confirm a proposed change to the mission. For example, S140 can present prompts to the operator—such as through an operator interface accessed through a web browser—to select one of longer mission time (e.g., due to reduced UAV cruise speed), reduced image resolution (e.g., due to increased altitude during imaging passes or increased step-over distance between imaging passes), or reduced size of ground area of interest (e.g., from removal of a portion of the original ground area of interest from the modified mission). In another example, S140 can prompt the user to set a position of a slider bar along a continuous slider defining a "greatest distance" position at one extreme and a "longest mission time" at an opposite extreme, and S140 can adjust parameters of the mission according to a compromise elected by the user through manipulation of the slider bar, as shown in FIG. 4. In another example, S140 can prompt the operator to confirm the modification, to cancel to mission, or to select a different UAV to perform the mission. S140 can also account for a margin of safety for calculating a range of the UAV and modifying mission parameters according to substantially ensure that the UAV will successfully land in a designated area.

In this variation, S140 can then upload an updated mission (or discrete modified parameters of the mission) to the UAV followed by a trigger to begin execution of the updated mission.

In yet another variation of a preferred embodiment, S140 can determine that the UAV cannot complete the mission as currently defined or receive confirmation from an operator to abort the mission, and thus order grounding of the UAV (performed by S150). For example, S150 can transmit a prompt to the UAV to immediately execute a landing sequence defined at an end of the mission currently loaded onto the UAV.

S150 includes initiating execution of the modified mission on the UAV. S150 preferably includes implementing modifications to the initial mission indicated by the modified mission parameters calculated in S140. S150 preferably includes executing modified mission parameters in real-time (e.g., if mission parameters are updated mid-mission) but may additionally or alternatively execute modified mission parameters at any time. For example, if modified mission parameters are calculated based on data collected during a pre-flight test, the modified mission parameters may be implemented whenever the modified mission is scheduled to begin (e.g., immediately after the pre-flight test, after a re-charge following the pre-flight test, or at any other time).

Data Logging

The method 100 may additionally include logging operation data of the UAV collected during execution of the prescribed mission by the UAV, and/or prompting an operator associated with the UAV to exchange a component within the UAV based on the operation data and a projected life of the component if necessary. Generally, logging operation data functions to collect data pertaining to use of the UAV and its subsystems over the course of various missions and to aggregate this data into logs through which discrete components or subsystems of the UAV can be monitored. Furthermore, as the UAV completes one mission after the next and as components and subsystems within exhibit increasing amounts of wear, component and subsystem logs can be compared to regulated or recommended component and subsystem lifespans and deliver prompts for preemptively exchanging components and subsystems of the UAV before predicted or projected failure.

A variety of data can be collected from the UAV during across various missions, such as a number of hours that the UAV is in flight, battery charge/discharge cycles, takeoffs and landings, ground or air distance travel, motor rotations, peak or average fuselage temperature, sun exposure, moisture (e.g., rain) exposure, peak or average battery temperature, peak battery output current and voltage, peak or average motor temperature, pitch, yaw, and roll response, maximum altitude, peak or average speed, etc. and then augment discrete logs for each critical component and subsystem within the UAV with these monitored data. This data may be collected as UAV operation data in S130 or may be collected independently/for other purposes. Data may be collected in real-time as the UAV executes a mission or at any other time; data collected can include raw sensor and actuator data from the UAV, or the UAV can compress any of these data and then transmit compressed flight data to the remote UAV management network.

In one example, discrete logs are maintained for each of a battery, a motor, a prop, a fuselage, control surface actuators, and/or any other high-wear or critical component or subsystem within a particular UAV, and these logs are stored on the remote UAV management network, in a remote database, and/or locally on the UAV, such as in memory within the co-pilot module. In this example, the UAV can distribute mission hours, charge/discharge cycle data, peak or average battery temperature, peak battery output current and voltage, and peak or average fuselage temperature to a battery-specific log; distribute mission hours, motor rotations, peak battery output current and voltage, and peak or average motor and fuselage temperature to a motor-specific log; and distribute mission hours, pitch, yaw, and roll response, maximum altitude, peak or average speed, sun exposure, moisture exposure, takeoff and landing data, and peak or average fuselage temperature to a fuselage-specific log.

Logs can be stored for components and/or subsystems of a UAV under a substantially unique identifier for the UAV or high-priority component within the UAV. For example, component and subsystems logs can be stored under an identifier pointing to the co-pilot module within the UAV, such as to a unique serial number or wireless communication address of the co-pilot. Alternatively, component and subsystems logs can be stored under an identifier pointing to a serial number of the fuselage or to a serial number or GPS address of the autopilot module within the UAV. UAV data can thus be stored under a unique identifier for that UAV to distinguish data from other UAVs (e.g., in a fleet of UAVs).

Furthermore, the UAV can maintain a database of component and subsystem regulated and/or manufacture-suggested part lives, compare a log for each critical component or subsystem within the UAV to these regulated and/or manufacture-suggested part lives, and deliver prompts to exchange components or subsystems within the UAV to an operator accordingly. For example, a manufacturer of a motor currently installed in the UAV can suggest a maximum useful life of 100 hours for the motor, the UAV can count each minute that the UAV in flight with the current motor, and transmit a prompt to exchange the motor to an account of an operator of the UAV when the number of hours on the motor reaches 95 hours, 98 hours, and 99 hours. In this example, the prompt can be accessed by the operator through a notification within a native UAV management application executing on a mobile computing device (e.g., a smartphone, a tablet,) or through a web browser executing on a computing device (e.g., a desktop computer, a laptop computer, a tablet). In another example, a government (e.g., federal) regulation can stipulate a maximum time of 200 hours, a maximum of two crashes, a maximum of 100 takeoffs, and a maximum heat exposure within a fuselage of 16,000° F.-hours (i.e., an integral of fuselage temperature over time in the air) for a UAV fuselage of the type (e.g., size) of the UAV, and the UAV can track each of these parameters in a fuselage-specific log for the UAV. In this example, the UAV can identify an upcoming breach of any of these regulated parameters by the UAV (or breach of the regulation in the event of a third crash) and deliver a corresponding notification to the operator to replace the fuselage of the UAV with a new fuselage (i.e., to move other actuators, sensors, and controllers from the old fuselage to the new fuselage).

Such prompts can be delivered to the operator at the beginning of a mission involving the UAV, during the mission with the UAV when a component within UAV approaches or surpasses one or more regulated or suggested lifespan, upon completion of the mission, and/or when the operator and/or the UAV are near a repair shop or service center. The UAV or UAV platform can also point the operator to stored log data of the UAV and/or to UAV data specific to component of the UAV referenced in the prompt. For example, an application can retrieve and open log data of the UAV in response to selection of the prompt. Operator access to UAV log data can therefore be handled through prompts (e.g., notifications).

The UAV (and/or platform) can similarly cooperate to detect components of the UAV that have already failed and to deliver corresponding prompts to the operator to replace the failed component(s) accordingly. However, the method 100 can function in any other way to log use of one or more components and/or subsystems of the UAV over a series of missions and to deliver any other suitable UAV maintenance prompt to an associated operator or operator account.

Component Update

The method 100 may additionally or alternatively include detecting a recent modification to a component installed in the UAV based on the operation data and an operation history of the UAV, and/or updating a flight record of the UAV according to the detected modification. Generally, detecting a recent modification functions to characterize operation of one or more current components or subsystems of the UAV and to compare these characterizations to previous characterizations of components and/or subsystems within the UAV to detect a possible recent exchange of a component or subsystem of the UAV. In particular, the detection process can extract a characteristic of a battery, a motor, a prop, a control surface actuator, and/or a fuselage of the UAV, etc. from UAV flight data collected during execution of a current pre-mission test sequence and/or a current mission and then compare these characteristics to characteristics of the same part types extracted from UAV data collected during execution of an immediately preceding pre-mission test sequence and/or an immediately preceding mission to detect a change in one or more characteristics that would suggest that one or more components (or subsystems) within the UAV was exchanged between the current and the preceding mission. Updates to the flight record can then function to automatically update a component or subsystem log to reflect a new component or subsystem installed into UAV, such as by resetting a log of a corresponding component or subsystem for total hours, heat exposure, takeoffs, and/or crashes, etc.

The method 100 characterizes UAV components from UAV data collected during pre-mission test sequences executed by the UAV before each mission such that characterizations may be generated from UAV data generated under substantially similar conditions (i.e., test flight paths)

across various missions on various different dates. UAV data can be characterized wherein the data is collected from an end (e.g., a final two minutes) of a previous flight, from a beginning (e.g., a first two minutes) of a current flight, and these characterizations are compared to automatically detect a change to a component or subsystem installed in the UAV.

In one example, the method 100 models a change in UAV air speed relative to a change in motor speed from current UAV data and detects that the prop of the UAV was replaced with a different (e.g., new) prop if the new model for UAV air speed relative to motor speed differs from a model for UAV air speed relative to motor speed calculated during a previous mission by more than a threshold amount. In this example, the method 100 can interface with an air speed sensor, or can calculate an air speed of the UAV based on a local wind speed and direction (retrieved from a weather database), GPS coordinates of the UAV, and a UAV trajectory.

In another example, the method 100 models a current draw of the motor relative to UAV air speed and detects that the motor of the UAV was replaced with a different (e.g., new) motor if the new model for motor current draw relative to UAV air speed differs from a similar model calculated during a previous mission by more than a threshold amount. In this example, the method 100 can also compensate for a prop change in this model. The method 100 can also compare the new motor current draw v. UAV air speed model to similar models of motor types currently available and suitable for the fuselage to predict what motor type was installed into the fuselage.

In yet another example, the method 100 models a sensitivity of the pitch, yaw, and roll of the UAV to changes in flight surfaces and compare this model to a similar model generated during a previous mission to determine if the fuselage of the UAV was repaired or replaced. The method 100 can also manipulate this current model in comparison to the previous model to detect changes to a payload carried by the UAV, to detect structure added to or removed from the fuselage, to detect a change in (or a new position of) a center of gravity of the UAV, or to detect a change in the weight of the UAV.

In another example, the method 100 models an output voltage of a battery within the UAV relative to throttle setting and compares this new model to a similar previous model to detect replacement of a battery previously installed in the UAV with a new battery.

As in these examples, the method 100 can also prompt an operator to confirm a detected change of a battery, motor, fuselage, or prop, etc. in the UAV, to enter whether the component is new, used, or refurbished, and/or to enter a make and model of the replaced component, etc. The UAV can then update a log corresponding to an exchanged component accordingly.

The method can implement similar methods and techniques to process UAV data in real-time and to make adjustment to UAV parameters substantially in real-time during execution of the current mission. For example, the method can monitor a state of charge of a battery within the UAV during a flight and then return the UAV to a launch site (or rally point, landing area, takeoff area, etc.) if the battery level approaches or reaches a threshold minimum state required to reliably return the UAV to an operator. In another example, the method can monitor local weather conditions—such as through sensors within the UAV or data retrieved from a remote weather database—and react to changing weather conditions by changing flight parameters of the UAV (e.g., speed, direction, attitude, subregion of a ground area of interest to fly over, etc.). In yet another example, the method can detect changes to the UAV and/or failures of component of the UAV while in flight and then automatically execute a corrective action (e.g., to execute a glide landing routine to land the UAV in a designated landing area in response to a detected motor failure) and/or deliver a prompt to an operator to take a corrective action accordingly. The method can therefore implement a 'continuous test sequence' (similar to the pre-mission test sequence) to collect and handle UAV data during execution of a mission. However, the method can implement any other method or technique to collect and handle data from one or more UAVs.

The UAV and methods of the invention can be embodied and/or implemented at least in part as a machine configured to receive a computer-readable medium storing computer-readable instructions. The instructions can be executed by computer-executable components integrated with the vehicle, scheduling kiosk(s), a remote scheduling server, hardware/firmware/software elements of a user computer or mobile device, or any suitable combination thereof. Other systems and methods of the invention can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for mission execution by an unmanned aerial vehicle (UAV) comprising:
    executing a pre-mission flight test evaluating: level flight at a first altitude with determination of an airspeed parameter of the UAV, a climb to a second altitude with determination of a thrust parameter of the UAV, and a transition of a motor of the UAV from a first to a second power setting with determination of a range of the UAV and a weight parameter of the UAV;
    determining a set of mission parameters, based upon the pre-mission flight test and corresponding to an initial mission, the mission parameters defining a first area to be imaged by a camera of the UAV;
    initiating execution of the initial UAV mission;
    collecting UAV operation data during flight of the UAV, the UAV operation data comprising aerial images taken at a first imaging resolution and flight telemetry data;
    calculating a set of modified mission parameters from the set of mission parameters and an analysis of aerial images, the set of modified mission parameters corresponding to a modified UAV mission; and
    automatically executing the modified mission with the UAV.

2. The method of claim 1, wherein the pre-mission flight test further evaluates at least one of: a stalling configuration with determination of a stall speed parameter of the UAV, battery management parameters of the UAV, terrain features associated with the initial mission, and image overlap characteristics.

3. The method of claim 1, wherein the pre-mission flight test evaluates the transition of the motor of the UAV from a no-power setting to a full-power setting with determination of a motor torque curve, a maximum motor torque, a motor efficiency curve, a propeller efficiency, a battery state of charge, and a maximum battery supply current.

4. The method of claim 1, wherein the set of mission parameters further defines a first set of camera parameters including an image capture setting.

5. The method of claim 4, wherein calculating the set of modified mission parameters comprises modifying the first set of camera parameters based on the analysis of aerial images.

6. The method of claim 1, further comprising generating the analysis of the aerial images, wherein generating comprises identifying a first image of the aerial images as including at least one of blur artifacts and shadow artifacts; wherein calculating the set of modified mission parameters comprises modifying the set of mission parameters to allow a subregion captured by the first image to be recaptured in another image.

7. The method of claim 1, further comprising determining that a first imaging resolution from the initial mission is below a threshold, wherein calculating the set of modified mission parameters comprises modifying the set of mission parameters with a second imaging resolution, wherein the second imaging resolution is higher than the first imaging resolution.

8. The method of claim 7, further comprising prompting a user, via a management application executing at a controller device, to set the second imaging resolution.

9. The method of claim 8, wherein calculating the set of modified mission parameters further comprises prompting the user, via the management application, to accept execution of the modified mission according to the set of modified mission parameters.

10. The method of claim 1, wherein executing the modified mission comprises executing the modified mission after initiating and before completing execution of the initial mission.

11. A method for adaptive mission execution by an unmanned aerial vehicle comprising:
    executing a pre-mission flight test evaluating: level flight at a first altitude with determination of an airspeed parameter of the UAV, a climb to a second altitude with determination of a thrust parameter of the UAV, and a transition of a motor of the UAV from a first to a second power setting with determination of a range of the UAV;
    determining a set of mission parameters, based upon the pre-mission flight test and corresponding to an initial mission, the mission parameters defining a first area to be imaged by a camera of the UAV;
    initiating execution of the initial mission with collection of a UAV operation dataset during the initial mission; and
    modifying behavior of the UAV based upon an analysis of the UAV operation dataset.

12. The method of claim 11, further comprising generating the analysis of the UAV operation dataset, wherein generating the analysis comprises generating a set of modified mission parameters from the set of mission parameters and an analysis of aerial images taken with the UAV, the set of modified mission parameters corresponding to a modified mission.

13. The method of claim 12, wherein the set of mission parameters comprise a first flight path and a first set of UAV flight parameters corresponding to the first flight path; wherein the set of modified mission parameters comprise a second flight path and a second set of UAV flight parameters corresponding to the second flight path; wherein the second flight path is modified from the first flight path.

14. The method of claim 12, further comprising prompting the user, via a management application executing at a controller device, to accept execution of the modified mission according to the set of modified mission parameters.

15. The method of claim 12, wherein modifying behavior of the UAV comprises automatically executing the modified mission with the UAV.

16. The method of claim 12, wherein generating the analysis comprises tracking at least one of a motor speed parameter, a propeller usage parameter, a control surface actuator usage parameter, and a fuselage usage parameter of the UAV during the initial mission; and generating a comparison between of at least one of the motor speed parameter, the propeller usage parameter, a control surface actuator usage parameter, and a fuselage usage parameter to and its respective life limit.

17. The method of claim 16, wherein modifying behavior of the UAV comprises pre-emptively replacing at least one of a motor, a propeller, a control surface actuator, and a fuselage of the UAV based on the comparison.

18. The method of claim 12, wherein generating the analysis comprises analyzing UAV battery charge data; wherein calculating the set of modified mission parameters comprises modifying the set of mission parameters based on the UAV battery charge data.

19. The method of claim 18, wherein generating the analysis further comprises determining, from the UAV battery charge data, that the unmanned aerial vehicle is incapable of completing the initial UAV mission; wherein calculating the set of modified mission parameters comprises verifying that the unmanned aerial vehicle is capable of completing the modified UAV mission.

20. The method of claim 12, wherein calculating the set of modified mission parameters further comprises receiving an input from the user regarding modification of mission parameters and calculating the set of modified mission parameters based on the input from the user.

* * * * *